(12) United States Patent
Bani Milhim (10) Patent No.: US 12,208,778 B2
(45) Date of Patent: Jan. 28, 2025

(54) SYSTEMS AND METHODS FOR ASSESSING HEALTH OF BRAKE ROTORS

(71) Applicant: GM GLOBAL TECHNOLOGY OPERATIONS LLC, Detroit, MI (US)

(72) Inventor: Alaeddin Bani Milhim, Pickering (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 235 days.

(21) Appl. No.: 18/077,691

(22) Filed: Dec. 8, 2022

(65) Prior Publication Data

US 2024/0190408 A1 Jun. 13, 2024

(51) Int. Cl.
*B60T 17/22* (2006.01)
*B60Q 9/00* (2006.01)
*F16D 66/02* (2006.01)

(52) U.S. Cl.
CPC ............... *B60T 17/22* (2013.01); *B60Q 9/00* (2013.01); *F16D 66/021* (2013.01); *B60T 2240/00* (2013.01); *B60T 2270/406* (2013.01)

(58) Field of Classification Search
CPC .... B60T 17/22; B60T 17/221; B60T 2240/00; B60T 2270/406; B60Q 9/00; F16D 66/021; F16D 2066/006
USPC ........................................ 701/70, 76, 78, 83
See application file for complete search history.

(56) References Cited

U.S. PATENT DOCUMENTS

| 11,220,251 B2 | 1/2022 | Du et al. |
| 2022/0297648 A1 | 9/2022 | Jalaliyazdi et al. |

*Primary Examiner* — Hai H Huynh (57) ABSTRACT

A system configured to assess health of a rotor of a friction brake configured to brake a wheel of a vehicle. The system includes a brake control module configured to actuate the friction brake at a target pressure sufficient to maintain the vehicle at a crawl speed. A diagnostic module is configured to, while the vehicle is at the crawl speed and the friction brake is at the target pressure: record rotational speed of the wheel; identify a change in the rotational speed of the wheel; and determine whether the change in the rotational speed of the wheel exceeds a predetermined threshold; generate a notification indicating that the rotor of the friction brake configured to brake the wheel is healthy; and generate a notification indicating that the rotor requires attention.

20 Claims, 6 Drawing Sheets

SYSTEMS AND METHODS FOR ASSESSING HEALTH OF BRAKE ROTORS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for assessing the health of brake rotors.

Disc brake systems typically include disc brakes on all wheels of a vehicle and a hydraulic cylinder such as a master cylinder. Each disc brake includes a brake rotor and a brake caliper. Each brake rotor is attached to one of the wheels and rotates with that wheel. Each brake caliper is attached to an axle or a suspension knuckle. When the disc brakes are applied, the brake calipers press brake pads against opposite planar surfaces of disc portions of the brake rotors to create friction and thereby decrease the rotational speeds of the wheels. The hydraulic cylinder regulates the pressure of brake fluid supplied to the disc brakes to apply or release the disc brakes.

SUMMARY

In a feature, the present disclosure includes a system configured to assess health of a rotor of a friction brake configured to brake a wheel of a vehicle. The system has a brake control module configured to actuate the friction brake at a target pressure sufficient to maintain the vehicle at a crawl speed. A diagnostic module is configured to, while the vehicle is at the crawl speed and the friction brake is at the target pressure: record rotational speed of the wheel; identify a change in the rotational speed of the wheel; and determine whether the change in the rotational speed of the wheel exceeds a predetermined threshold; generate a notification indicating that the rotor of the friction brake configured to brake the wheel is healthy; and generate a notification indicating that the rotor requires attention.

In further features, the predetermined threshold is a first predetermined threshold and the notification is a first notification; and when the change in the rotational speed of the wheel exceeds a second predetermined threshold that is greater than the first predetermined threshold, the diagnostic module is configured to generate a second notification indicating that the rotor of the friction brake configured to brake the wheel requires replacement.

In further features, the change in the rotational speed of the wheel at the second predetermined threshold is three times the change in the rotational speed of the wheel at the first predetermined threshold.

In further features, the diagnostic module is configured to record the rotational speed of the wheel and identify the change in the rotational speed of the wheel only when the vehicle is traveling in a straight line on a smooth surface.

In further features, the target pressure is 20 psi, and at the crawl speed, the rotational speed of the wheel is greater than 0 and less than or equal to 1 revolution/second.

In a feature, the present disclosure includes a system configured to assess health of a rotor of a friction brake configured to brake a wheel of a vehicle. The system includes a brake control module configured to generate a brake control signal indicating a target pressure of brake fluid to be directed to the friction brake for actuating the friction brake to clamp brake pads onto opposite sides of the rotor, the target pressure sufficient to maintain the vehicle at a crawl speed. A master hydraulic cylinder is configured to receive the brake control signal and regulate brake fluid pressure to the friction brake based on the brake control signal to achieve the target pressure of brake fluid at the friction brake and maintain the vehicle at the crawl speed. A diagnostic module is configured to, while the vehicle is at the crawl speed, the brake fluid of the friction brake is at the target pressure, and the vehicle is traveling in a straight line: record rotational speed of the wheel; identify a change in the rotational speed of the wheel; determine whether the change in the rotational speed of the wheel exceeds a predetermined threshold; and when the change in the rotational speed of the wheel exceeds a predetermined threshold, generate a notification indicating that the rotor of the friction brake configured to brake the wheel requires attention.

In further features, the target pressure is 20 psi.

In further features, at the crawl speed, the rotational speed of the wheel is greater than 0 revolutions/second and less than or equal to 1 revolution/second.

In further features, at the crawl speed, the rotational speed of the wheel is 0.4 revolutions/second.

In further features, at the crawl speed, speed of the vehicle is greater than 0 kph. and less than or equal to 0.01 kph.

In further features, at the crawl speed, speed of the vehicle is 0.005 kph.

In further features, the predetermined threshold is a first predetermined threshold and the notification is a first notification; and when the change in the rotational speed of the wheel exceeds a second predetermined threshold that is higher than the first predetermined threshold, the diagnostic module is configured to generate a second notification indicating that the rotor of the friction brake configured to brake the wheel requires replacement.

In further features, the change in the rotational speed of the wheel at the second predetermined threshold is three times the change in the rotational speed of the wheel at the first predetermined threshold.

In further features, the first predetermined threshold is $0.4 \times 10^{-3}$ revolutions/second$^2$, and the second predetermined threshold is $1.2 \times 10^{-3}$ revolutions/second$^2$.

In a feature, the present disclosure includes a system configured to assess health of a rotor of a friction brake configured to brake a wheel of a vehicle. The system includes a brake control module configured to generate a brake control signal indicating a target pressure of brake fluid to be directed to the friction brake for actuating the friction brake by clamping brake pads onto opposite sides of the rotor, the target pressure sufficient to maintain the vehicle at a crawl speed. A master hydraulic cylinder is configured to receive the brake control signal and regulate brake fluid pressure to the friction brake based on the brake control signal to achieve the target pressure of brake fluid at the friction brake and maintain the vehicle at the crawl speed. A diagnostic module is configured to, while the vehicle is at the crawl speed, the brake fluid of the friction brake is at the target pressure, and the vehicle is traveling in a straight line: record angular velocity of the wheel; determine angular acceleration of the wheel based on the angular velocity of the wheel when the target pressure of the brake fluid is achieved; and generate a rotor health notification based on an absolute value of the angular acceleration.

In further features, the rotor health notification includes a healthy rotor notification indicating that the rotor is healthy when an absolute value of the angular acceleration is at or below a healthy threshold; an inspect rotor notification indicating that the rotor is in need of inspection when the absolute value of the angular acceleration is above the healthy threshold and below a replacement threshold; and a replace rotor notification indicating that the rotor is in need of replacement when the absolute value of the angular acceleration is above the replacement threshold.

In further features, the replacement threshold is three times the healthy threshold.

In further features, the target pressure is 20 psi.

In further features, at the crawl speed, rotational speed of the wheel is greater than 0 and less than or equal to 1 revolution/second.

In further features, at the crawl speed, speed of the vehicle is greater than 0 kph. and less than or equal to 0.01 kph.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
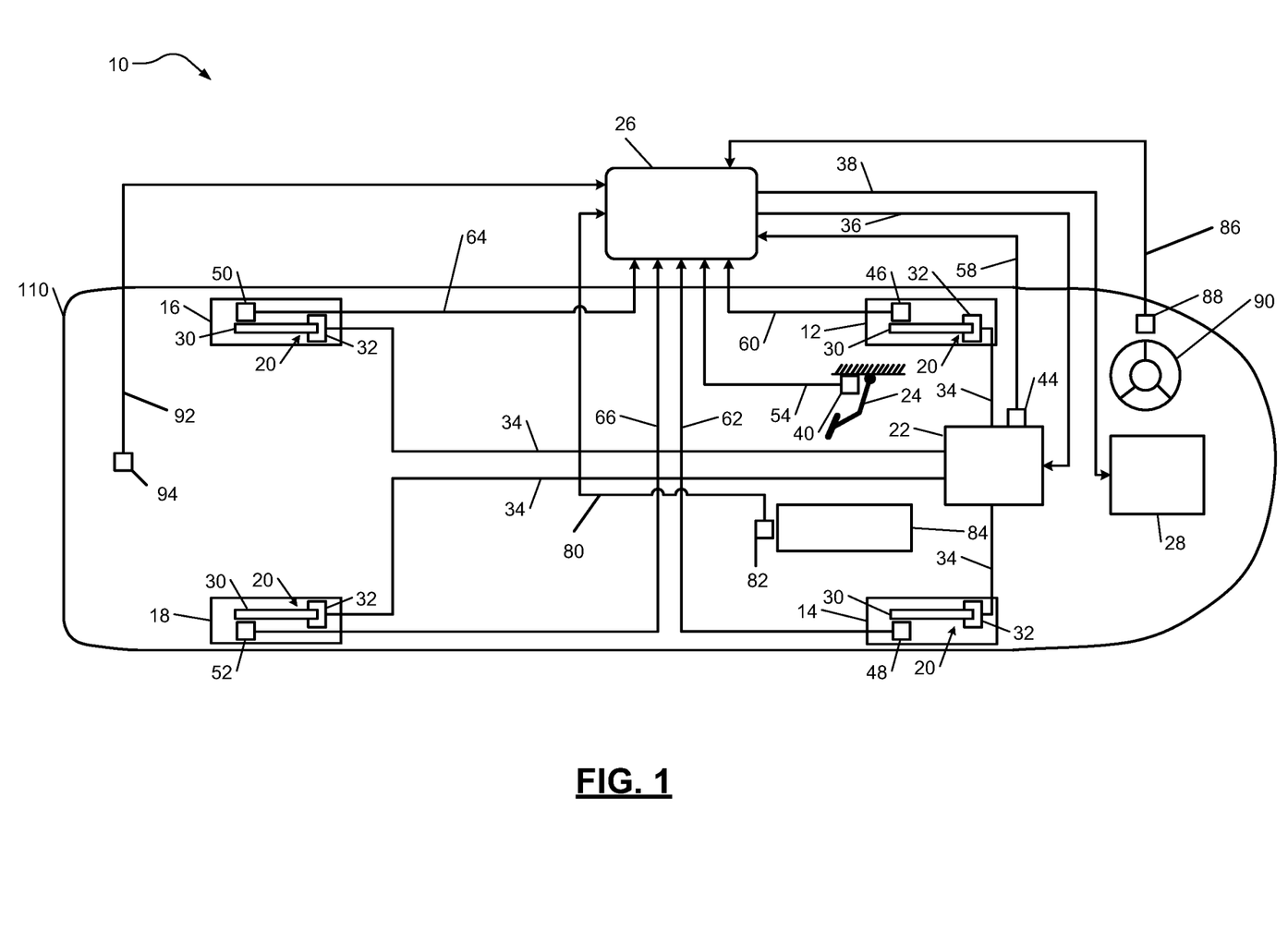
FIG. 1 is a functional block diagram of an exemplary vehicle system in accordance with the present disclosure configured to assess health of brake rotors.

FIG. 1 illustrates an exemplary vehicle system 10 in accordance with the present disclosure. The system 10 may be used with any suitable vehicle 110, such as a four-wheel vehicle as illustrated, or any other vehicle. In the example illustrated, the vehicle system 10 includes a left front wheel 12, a right front wheel 14, a left rear wheel 16, and a right rear wheel 18. The system 10 further includes friction brakes 20, a master hydraulic cylinder 22, a brake pedal 24, a vehicle control module 26, and a user interface device 28. Each friction brake 20 is coupled to one of the wheels 12, 14, 16, or 18. Each friction brake 20 decreases the rotational speed of the wheel 12, 14, 16, or 18 that the particular friction brake 20 is coupled to.

The friction brakes 20 are disc brakes. Thus, each friction brake 20 includes a brake rotor 30 and a brake caliper 32. The brake rotor 30 is attached to one of the wheels 12, 14, 16, or 18 and rotates therewith. Each brake caliper 32 is attached to an axle (not shown) or a suspension knuckle (not shown). When the friction brakes 20 are applied, the brake calipers 32 press brake pads (not shown) against opposite planar surfaces of the brake rotors 30 to create friction and thereby decrease the rotational speeds of the wheels 12, 14, 16, 18.

The master hydraulic cylinder 22 regulates the pressure of brake fluid in brake lines 34 that extend from the master hydraulic cylinder 22 to the friction brakes 20. For example, the master hydraulic cylinder 22 increases the pressure of brake fluid in the brake line 34 that extends to the friction brake 20 on the left front wheel 12 to apply that friction brake 20. Conversely, the master hydraulic cylinder 22 decreases the pressure of brake fluid in the brake line 34 that extends to the friction brake 20 on the left front wheel 12 to release that friction brake 20.

The vehicle control module 26 controls the master hydraulic cylinder 22 to apply and release the friction brakes 20. In one example, the vehicle control module 26 applies the friction brakes 20 when a driver depresses the brake pedal 24, and the vehicle control module 26 releases the friction brakes 20 when the driver stops depressing the brake pedal 24. In another example, the vehicle control module 26 applies and releases the friction brakes 20 when performing functions such as anti-lock braking, stability control, and traction control. If the vehicle 110 is equipped with automatic braking, the vehicle control module 26 controls the master hydraulic cylinder 22 to apply the friction brakes 20 when various predetermined conditions are present, such as to avoid an obstacle, for example. If the vehicle 110 is an autonomous vehicle, the vehicle control module 26 controls the master hydraulic cylinder 22 to apply and release the friction brakes 20 based on commands from an autonomous vehicle control module.

The vehicle control module 26 controls the master hydraulic cylinder 22 by outputting a brake control signal (BCS) 36 to the master hydraulic cylinder 22. The brake control signal 36 indicates which of the friction brakes 20 to apply and the amount by which to apply the friction brakes 20. In one example, the brake control signal 36 indicates a target pressure of brake fluid in each brake line 34 or a target brake torque, and the master hydraulic cylinder 22 regulates the pressure of brake fluid within the brake lines 34 to achieve the target pressure or the target brake torque.

The vehicle control module 26 controls the user interface device 28 to generate messages. The user interface device 28 is operable to generate a visual message (e.g., text, a light, and/or a symbol), an audible message (e.g., a chime), and/or a tactile message (e.g., a vibration). The user interface device 28 may include an electronic display (e.g., a touchscreen), a speaker, and/or a vibrating motor. The vehicle control module 26 controls the user interface device 28 by outputting a user interface device (UID) control signal 38 to the user interface device 28. The UID control signal 38 indicates the messages to be generated by the user interface device 28.

The vehicle control module 26 controls the friction brakes 20 and the user interface device 28 based on inputs from sensors. The sensors include a brake pedal position (BPP) sensor 40, a brake circuit pressure (BCP) sensor 44, a left front wheel speed (WS) sensor 46, a right front WS sensor 48, a left rear WS sensor 50, and a right rear WS sensor 52. The BPP sensor 40 measures the position of the brake pedal 24 and generates a BPP signal 54 indicating the brake pedal position (e.g., a depression percentage). The BCP sensor 44 measures the pressure of brake fluid within the master hydraulic cylinder 22, which is referred to herein as brake circuit pressure, and generates a BCP signal 58 indicating the brake circuit pressure.

If the vehicle system 10 is part of a self-driving or autonomous vehicle, the brake pedal 24 may be omitted from the vehicle system 10, and boost plunger position may be used in place of the brake pedal position throughout this application. If the brake pedal 24 is not omitted from the vehicle system 10, the boost plunger position may be used in addition to the brake pedal position. The boost plunger position is the position of a boost plunger (not shown), which may be connected to the brake pedal 24 or, in the case of an autonomous vehicle actuated by a device (not shown). Thus, the boost plunger position, like the brake pedal position, indicates an amount of braking demanded by the driver, although the driver is a module in an autonomous vehicle.

The left front WS sensor 46 measures the rotational speed of the left front wheel 12 and generates a WS signal 60 indicating the left front wheel speed. The right front WS sensor 48 measures the rotational speed of the right front wheel 14 and generates a WS signal 62 indicating the right front wheel speed. The left rear WS sensor 50 measures the rotational speed of the left rear wheel 16 and generates a WS signal 64 indicating the left rear wheel speed. The right rear WS sensor 52 measures the rotational speed of the right rear wheel 18 and generates a WS signal 66 indicating the right rear wheel speed.

The brake calipers 32 press the brake pads against the opposite planar surfaces of the brake rotors 30 to create friction and thereby decrease the rotational speeds of the wheels 12, 14, 16, 18. Over time, this may cause inconsistent wear on opposite planar surfaces of the brake rotors 30, which may result in variations in the thicknesses of the brake rotors 30. As the thickness variation of the brake rotors 30 increases, the friction brakes 20 may not perform as well as when they were new.

Figure 2:
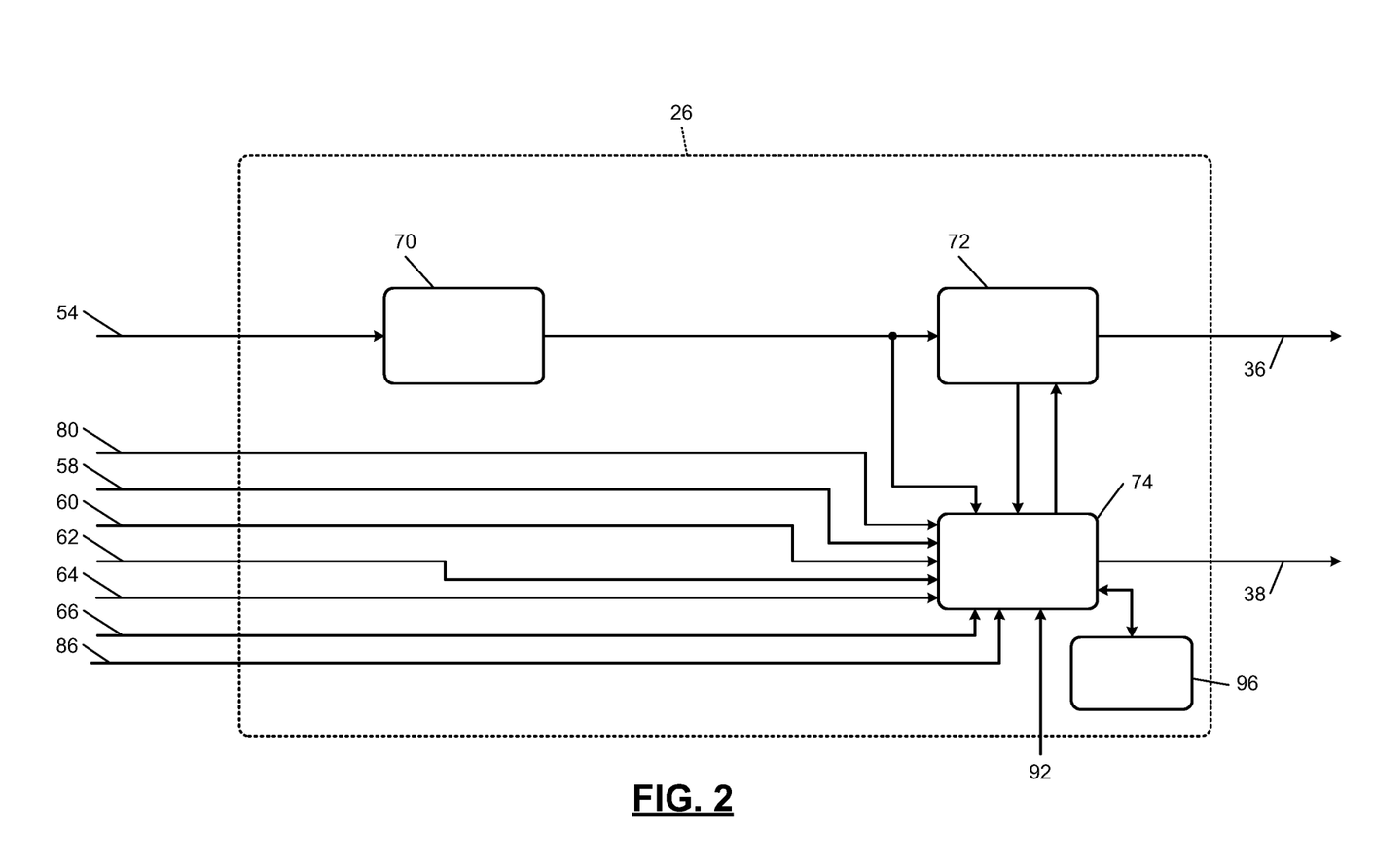
FIG. 2 is a functional block diagram of an exemplary vehicle control module of the system of FIG. 1.

With continued reference to FIG. 1, and additional reference to FIG. 2, the vehicle control module 26 includes a brake torque request module 70, a brake control module 72, and a diagnostic module 74. The brake torque request module 70 generates a brake torque request based on the brake pedal position indicated by the BPP signal 54. Additionally or alternatively, the brake torque request module 70 may generate the brake torque request based on the boost plunger position. Additionally or alternatively, the brake torque request module 70 may generate the brake torque request based on an input from an anti-lock brake system, a stability control system, a traction control system, an automatic braking system, and/or an autonomous vehicle system. The brake torque request module 70 outputs the brake torque request.

The brake control module 72 applies one or more (e.g., all) of the friction brakes 20 to satisfy the brake torque request during a braking event. The brake control module 72 applies the friction brakes 20 by outputting the brake control signal 36 to the master hydraulic cylinder 22. As discussed above, the brake control signal 36 may indicate a target pressure or target brake torque for each friction brake 20. Thus, the brake control module 72 may control the friction brakes 20 to simultaneously apply different brake torques on different ones of the wheels 12, 14, 16, 18. The brake control module 72 may output a signal to the diagnostic module 74 indicating when the friction brakes 20 are applied and which ones of the friction brakes 20 are applied.

The diagnostic module 74 assesses the health of the brake rotors 30 based on the inputs from the sensors during the braking event. The inputs include the BCP signal 58 and the WS signals 60, 62, 64, and 66. Additional inputs include a drive mode signal 80 generated by a drive mode sensor 82, which monitors the mode that the drive mode selector 84 is in, such as park, forward, reverse, or neutral. The diagnostic module 74 also receives a steering angle signal 86 from a steering sensor 88, which monitors the steering angle of steering wheel 90.

Another input to the diagnostic module 74 may be a road condition signal 92 generated by a road condition sensor 94. The road condition sensor 94 may be any sensor or group of sensors configured to identify the condition of the road that the vehicle 110 is traveling on, such as whether the road is smooth and generally uniform. For example, the road condition sensor 94 may include any suitable camera, radar, lidar, etc. configured to monitor and identify the condition of the road that the vehicle 110 is traveling on, such as whether the road surface is smooth and uniform. The road condition sensor 94 may alternatively be or include a GPS receiver configured to receive GPS signals indicating the location of the vehicle 110, which may be plotted against map data to identify the location of the vehicle 110 and the type of road that the vehicle 110 is on, such as whether the road is paved and smooth or unpaved. The road condition sensor 94 may also include a vehicle-to-everything (V2X) sensor configured to receive signals from roadside transmitters identifying road conditions and road surface type.

The diagnostic module 74 controls the user interface device 28 to generate a message indicating the health of the brake rotors 30. The diagnostic module 74 controls the user interface device 28 by outputting the UID control signal 38 to the user interface device 28. The diagnostic module 74 may output a signal to the brake control module 72 indicating which of the friction brakes 20 to apply to satisfy the brake torque request.

Figure 3:
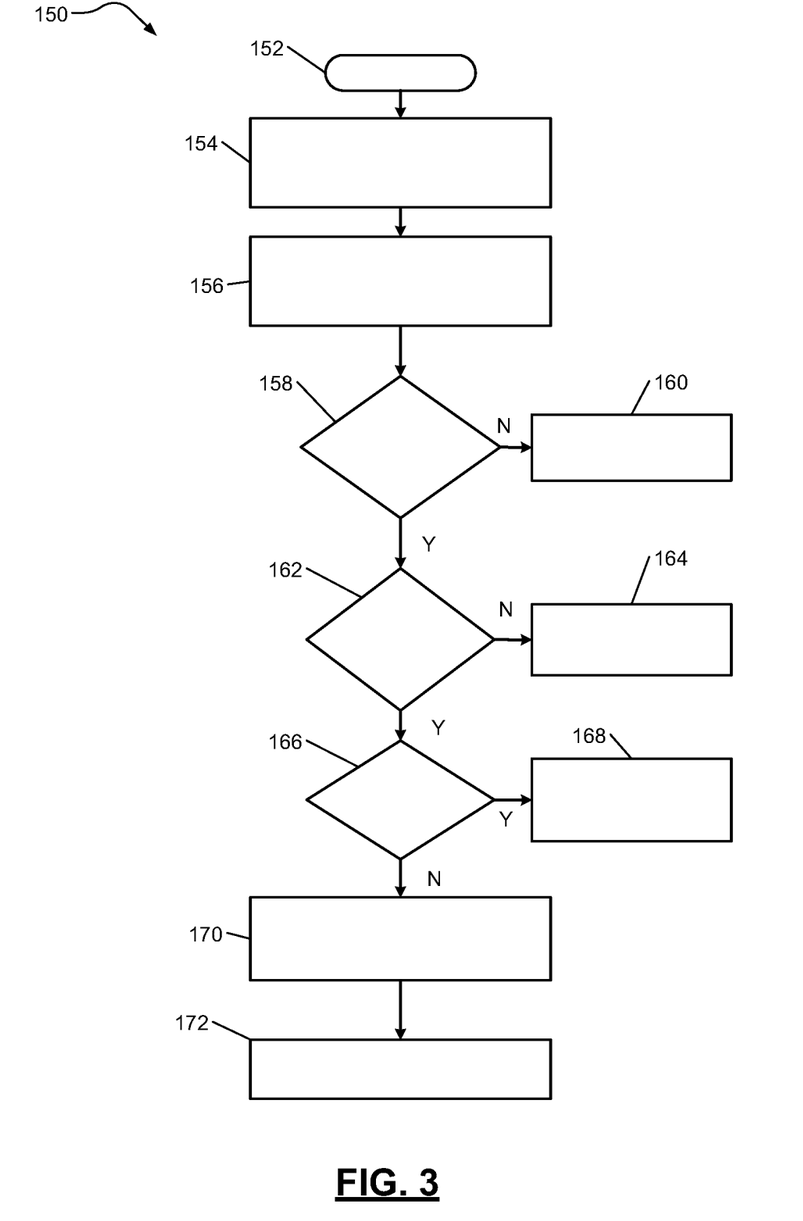
FIG. 3 is a flow chart illustrating an exemplary method of assessing health of a brake rotor in accordance with the present disclosure.

FIG. 3 illustrates an exemplary method 150 in accordance with the present disclosure for assessing the health of the brake rotors 30. The method 150 is described herein as bring performed by the vehicle control module 26. However, the method 150 may be performed by any other suitable module. Thus, the particular modules that perform the method 150 may differ from the description below. Additionally or alternatively, one or more steps of the method 150 may be performed independent of any module. In general, the vehicle control module 26 assesses the health of the brake rotors 30 by recording vehicle data under predefined braking conditions, as explained further herein and illustrated in FIG. 3. The recorded vehicle data includes, for example, the following: wheel angular velocity as recorded by the wheel speed sensors 46, 48, 50, and 52; and brake pressure as recorded by the brake circuit pressure sensor 44.

The method 150 for assessing the health of the brake rotors 30 begins at block 152. At block 152, the method 150 may be started manually, such as by a driver or a technician, for example. The method 150 may be manually started using the user interface device 28, or any other suitable interface, such as an interface that is in wireless or wired communication with the diagnostic module 74. Alternatively, the method 150 may be automatically initiated by the diagnostic module 74 when predefined conditions are present. For example, the diagnostic module 74 may be configured to carry out the method 150 at any suitable mileage intervals, time intervals, etc. From block 152, the method proceeds to block 154.

At block 154, the brake control module 72 generates the brake control signal 36 indicating a target pressure of brake fluid to be directed to the friction brakes 20 for actuating the friction brakes by clamping brake pads held by the calipers 32 onto opposite sides of the rotors 30. The target pressure is sufficient to maintain the vehicle at a crawl speed. The rotational speed of the wheels 12, 14, 16, 18 at the crawl speed may be greater than 0 revolutions/second and less than or equal to 1 revolution/second, for example. At the crawl speed, the rotational speed of the wheels 12, 14, 16, 18 may be 0.4 revolutions/second, for example. At the crawl speed, the speed of the vehicle 110 may be greater than 0 kph. and less than or equal to 0.01 kph, for example. The crawl speed of the vehicle may be 0.005 kph., for example. The target pressure of brake fluid may be 20 psi. for example.

The master hydraulic cylinder 22 is configured to receive the brake control signal 36, and regulate brake pressure to the friction brakes 20 based on the brake control signal 36 to achieve the target pressure of brake fluid at the friction brakes 20 and maintain the vehicle 110 at the crawl speed. From block 154, the method 150 proceeds to block 156.

At block 156, the diagnostic module 74 monitors rotational speed of the wheels 12, 14, 16, and 18 at the crawl speed and the target brake pressure. From block 156, the method 150 proceeds to block 158. At block 158, based on the WS signals 60, 62, 64, 66, the diagnostic module 74 determines whether rotational speed of any one of the wheels 12, 14, 16, and 18 has changed while at the constant crawl speed and constant target brake pressure. The rotational speed will typically be reduced when the brake pads on the calipers 32 travel over a bump on the brake rotors 30 resulting from wear proximate to the bump. The rotational speed will typically increase when the brake pads on the calipers 32 travel over points on the brake rotors 30 that have become less thick due to wear.

If rotational speed of none of the wheels 12, 14, 16, 18 has changed, then at block 160 the diagnostic module 74 commands the user interface device 28 to generate a notification that the rotors 30 are healthy. The notification may be transmitted to the user in any other suitable manner (e.g., email, smartphone notification, etc.). The notification may be transmitted to any other suitable location as well, such as to a dealership, fleet operator, manufacturer, etc.

If at block 158 the diagnostic module 74 determines that rotational speed of one or more of the wheels 12, 14, 16, 18 has changed, then the method 150 proceeds to block 162. At block 162, the diagnostic module 74 determines whether the change in the rotational speed is greater than a first predetermined threshold. If not, then the method 150 proceeds to block 164, where the healthy rotor notification is generated. If the change is greater than the first predetermined threshold, then the method proceeds to block 166.

At block 166, the diagnostic module 74 determines whether the change in rotational speed is greater than, or equal to, the first predetermined threshold, but less than a second predetermined threshold. If it is, then the method 150 proceeds to block 168. At block 168, the diagnostic module 74 commands the user interface device 28 to generate a notification that attention is required for the rotor 30 associated with the wheel 12, 14, 16, 18 that has experienced the change in rotational speed. If at block 166 the diagnostic module 74 determines that the change in rotational speed is greater than, or equal to, the first threshold, but not less than the second threshold, the method 150 proceeds to block 170.

At block 170, the diagnostic module 74 confirms that the change in rotational speed is greater than, or equal to, the second predetermined threshold. From block 170, the method 150 proceeds to block 172. At block 172, the diagnostic module 74 commands the user interface device 28 to generate a notification that the rotor 30 associated with the wheel 12, 14, 16, 18 that has experienced the change in rotational speed greater than the second predetermined threshold is in need of replacement.

The second predetermined threshold is greater than the first predetermined threshold. The second predetermined threshold may be three times as great a change in rotational speed as compared to the first predetermined threshold. For example, the first predetermined threshold may be a change of $0.4 \times 10^{-3}$ revolutions/second$^2$, and the second predetermined threshold may be a change of $1.2 \times 10^{-3}$ revolutions/second$^2$.

Figure 4A:
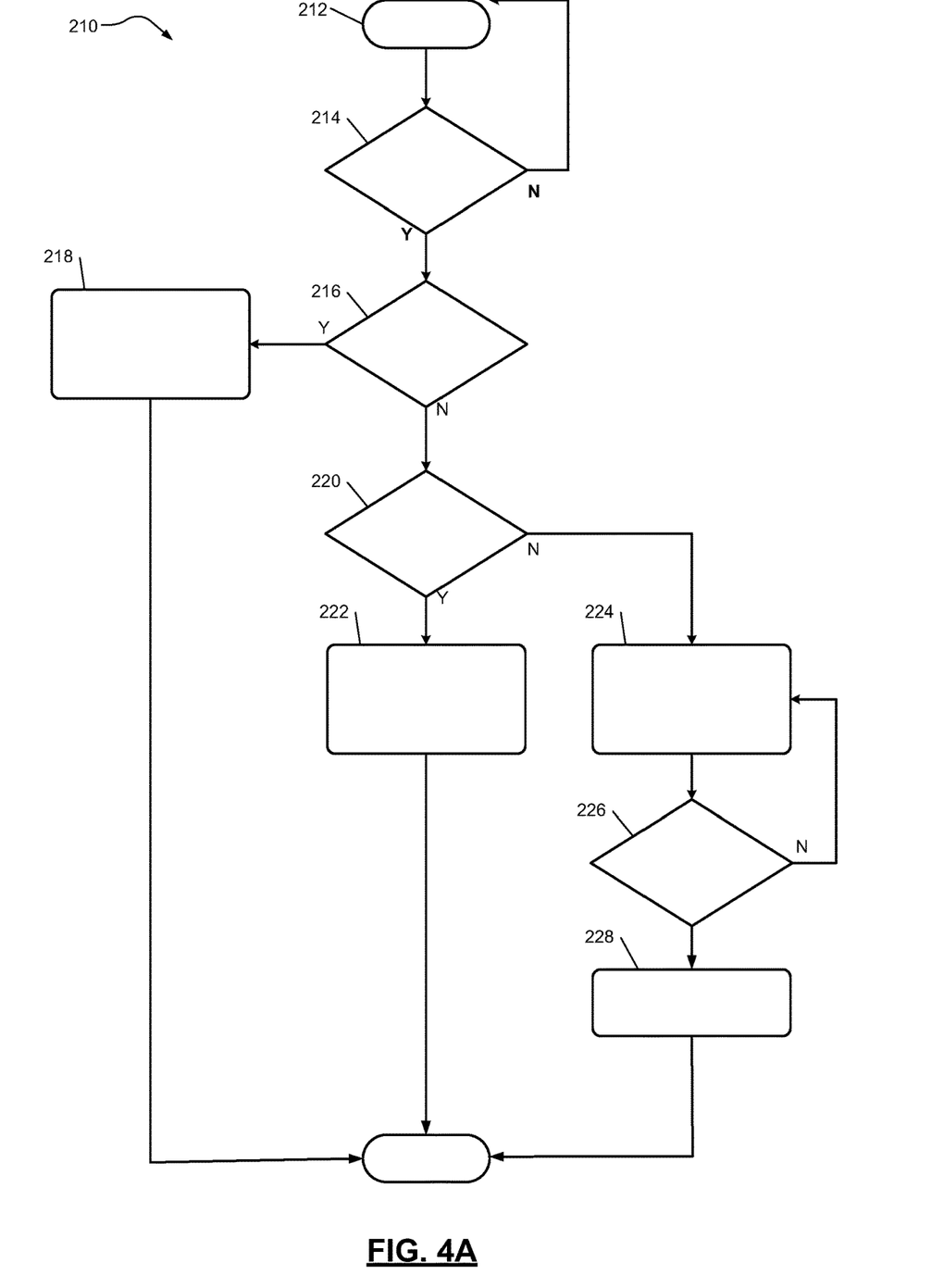
FIG. 4A is a flowchart illustrating another exemplary method of assessing health of a brake rotor in accordance with the present disclosure.
Figure 4B:
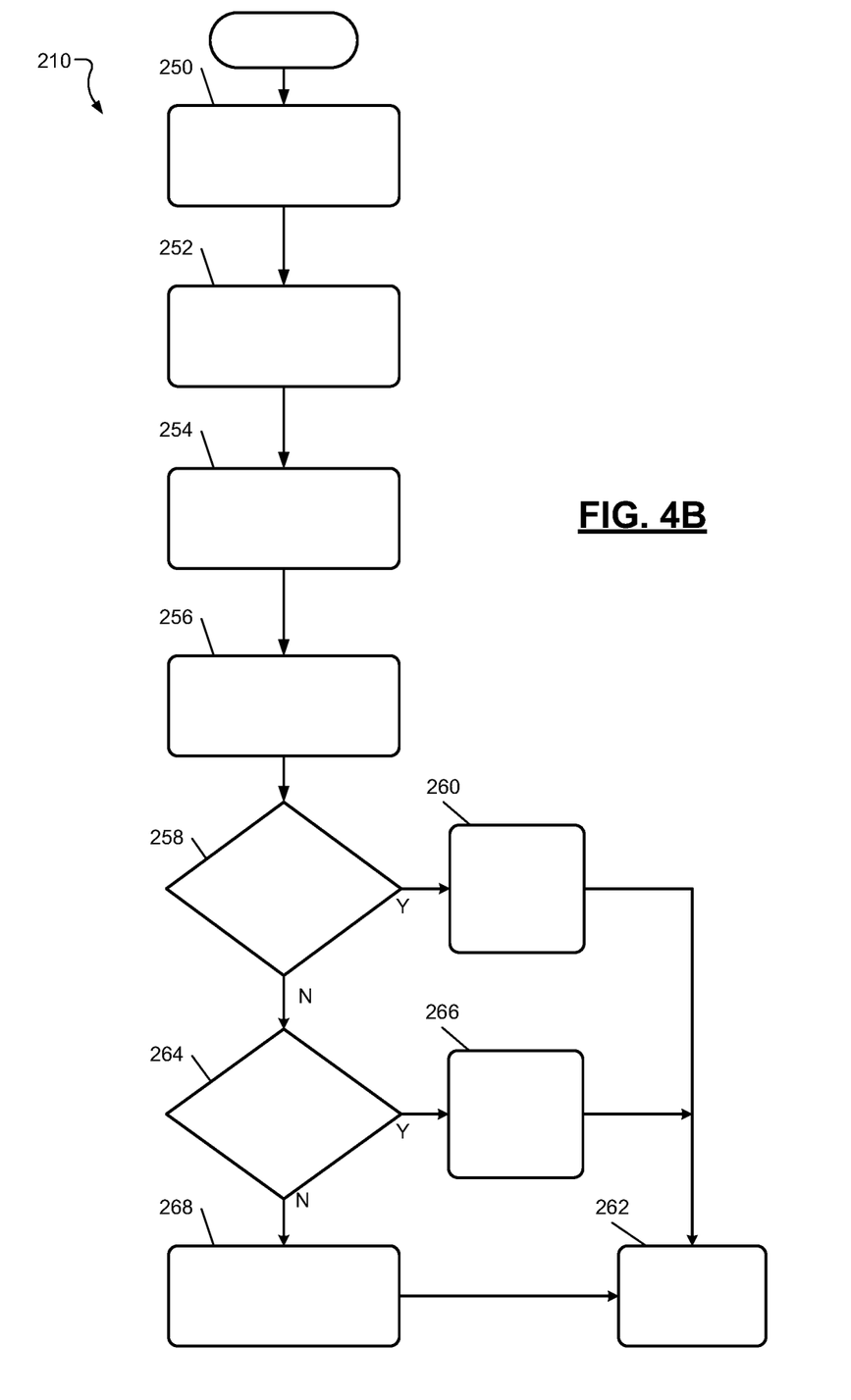
FIG. 4B is a continuation of the flowchart of FIG. 4A.

FIGS. 4A and 4B illustrate another exemplary method 210 in accordance with the present disclosure for assessing the health of the brake rotor 30. The method 210 is described herein as being performed by the vehicle control module 26. However, the method 210 may be performed by any other suitable module. Thus, the particular modules that perform the method 210 may differ from the description below. Additionally or alternatively, one or more steps of the method 210 may be performed independent of any module.

In general, the vehicle control module 26 assesses the health of the brake rotors 30 by recording vehicle data under predefined braking conditions, as explained further herein and illustrated in FIGS. 4A and 4B. The recorded vehicle data includes, for example, the following: wheel angular velocity as recorded by the wheel speed sensors 46, 48, 50, and 52; and brake pressure as recorded by the brake circuit pressure sensor 44. From the wheel angular velocity, an angular acceleration derivative is taken, and the absolute value of the angular acceleration is used as a health indicator of the brake rotors 30. Based on the health indicator level, the brake rotor is estimated to be healthy, in need of attention, or in need of replacement. A notification is then sent to the driver by way of the user interface device 28 informing the driver of the brake health assessment.

The method 210 for assessing the health of the brake rotors 30 begins at block 212. At block 212, the method 210 may be started manually, such as by a driver or a technician, for example. The method 210 may be manually started using the user interface device 28, or any other suitable interface, such as an interface that is in wireless or wired communication with the diagnostic module 74. Alternatively, the method 210 may be automatically initiated by the diagnostic module 74 when predefined conditions are present. For example, the diagnostic module 74 may be configured to perform the method 210 at any suitable mileage intervals, time intervals, etc. From block 212, the method proceeds to block 214.

At block 214, the diagnostic module 74 determines whether various vehicle operating conditions required for the method 210 have been satisfied, such as the following: 1) the vehicle 110 is in forward drive mode; 2) the vehicle 110 is traveling in a straight line; and 3) the vehicle 110 is on a generally smooth and uniform road surface. The diagnostic module 74 determines whether the vehicle 110 is in forward drive mode based on the drive mode signal 80. The diagnostic module 74 determines whether the vehicle 110 is traveling in a straight line based on the steering angle signal 86. The diagnostic module 74 determines whether the vehicle 110 is on a generally smooth and uniform road surface based on the road condition signal 92. If based on the sensor signals 80, 86, and 92 the diagnostic module 74 determines that the vehicle 110 is traveling in forward drive mode, in a straight line, on a generally smooth and uniform surface, and that it is safe to do so, the method 210 proceeds to block 216. It will be considered safe to proceed when, for example, no obstacles are detected ahead of the vehicle. Otherwise, the method 210 returns to blocks 212 and 214, and the method 210 does not proceed until the vehicle conditions at block 214 are satisfied.

At block 216, the vehicle control module 26 determines whether the vehicle 110 is equipped with automatic braking. Automatic braking is a feature whereby the vehicle control module 26 operates the brake control module 72 to clamp the brake calipers 32 onto the brake rotors 30 to slow and stop the vehicle 110 as appropriate, such as in response to traffic, a traffic signal, an obstacle, etc. Autonomous vehicles are equipped with automatic braking, and many self-driving vehicles are as well as a safety feature. Automatic braking may also be configured to facilitate execution of the method 210, as explained herein.

If the vehicle 110 is equipped with automatic braking, the method 210 proceeds from block 216 to block 218. At block 218, in response to a command from the diagnostic module 74 to check the health of the brake rotors 30, the brake control module 72 transmits the brake control signal 36 to the master hydraulic cylinder 22 to set the master hydraulic cylinder pressure to a predetermined threshold value. The predetermined threshold value may be 20 psi, or any other suitable threshold pressure. Setting the master hydraulic cylinder pressure to the predetermined threshold will also keep the speed of the vehicle below a predetermined maximum speed over which the method 210 will not be performed. After the master hydraulic cylinder 22 is set to the predetermined threshold pressure, the method 210 proceeds from block 218 to block 250 of FIG. 4B.

If the vehicle 110 is not equipped with automatic braking, the method 210 proceeds from block 216 to block 220. At block 220, the vehicle control module 26 checks whether the diagnostic module 74 is equipped with a vehicle data recorder 96. The vehicle data recorder 96 is configured to record, during regular vehicle operations, the wheel angular velocity as measured by the wheel speed sensors 46, 48, 50, and 52; and record the brake circuit pressure based on inputs from the brake circuit pressure sensor 44.

If at block 220 the vehicle control module 26 determines that the vehicle 110 is equipped with the vehicle data recorder 96, the method 210 proceeds to block 222. At block 222, the diagnostic module 74 continuously monitors the pressure of the master hydraulic cylinder 22 based on the BCP signal 58. When the diagnostic module 74 identifies the pressure of the master hydraulic cylinder 22 as being at the predetermined master cylinder pressure value, such as 20 psi., for example, the method 210 proceeds from block 222 to block 250 of FIG. 4B. As an alternative to monitoring pressure of the master hydraulic cylinder 22, at block 222 the diagnostic module 74 may monitor the brake pedal position based on the BPP signal 54, and/or pressure of the brake calipers 32 on the rotors 30. Once the brake pedal 24 is at a predetermined position, and/or pressure of the brake calipers 32 on the rotors 30 is at a predetermined pressure, the method 210 proceeds to block 250 of FIG. 4B.

If at block 220 the vehicle control module 26 determines that the vehicle 110 is not equipped with the vehicle data recorder 96, the method 210 proceeds to block 224. At block 224, the diagnostic module 74 instructs the driver, by way of the user interface device 28, to slowly release the brake pedal 24. The driver will be instructed to slowly release the brake pedal 24 until, at block 226, the vehicle speed is greater than 0 kph and less than a predetermined maximum threshold. The predetermined threshold may be, for example, 0.005 kph. In general, the smaller that the predetermined maximum threshold is, the more accurate the method 210 will be at assessing brake rotor health. If the vehicle speed is not greater than 0 kph and less than the predetermined maximum threshold, then the method 210 returns to block 224. When the vehicle speed is greater than 0 kph. and less than the predetermined maximum, the method 210 proceeds from block 226 to block 228. At block 228, the diagnostic module 74 instructs the driver, such as by way of the user interface device 28, to hold the position of the brake pedal 24 so that the brake pressure stays constant. From block 228, the method 210 proceeds to block 250.

At block 250 of FIG. 4B, the diagnostic module 74 identifies the angular velocity of each one of the wheels 12, 14, 16, and 18. The angular velocity for each one of the wheels 12, 14, 16, and 18 is measured by the wheel speed sensors 46, 48, 50, and 52 respectively. The wheel speed sensors 46, 48, 50, and 52 may in some applications measure the wheel speed in revolutions per minute, which the diagnostic module 74 is configured to convert to revolutions per second. If the vehicle 110 is not equipped with wheel speed sensors 46, 48, 50, and 52, the diagnostic module 74 determines the wheel angular velocity as follows: wheel angular velocity=vehicle velocity/($\pi$*wheel diameter).

From block 250, the method 210 proceeds to block 252. At block 252, the diagnostic module 74 identifies the time required for each of the wheels 12, 14, 16, and 18 to rotate a set number of rotations (twice, for example) based on the wheel speed signals 60, 62, 64, and 66 from the wheel speed sensors 46, 48, 50, and 52 respectively. If the vehicle 110 is not equipped with the wheel speed sensors 46, 48, 50, and 52, then the diagnostic module 74 calculates the time required for each of the wheels 12, 14, 16, and 18 to rotate as follows: wheel revolution/second=vehicle speed/($\pi$*wheel diameter). The number of rotations is used to confirm irregularities in the brake rotor thickness and isolate any noise, such as a possible brake pressure misreading. The number of rotations may be two, three, or four times, for example, or more.

Figure 5A:
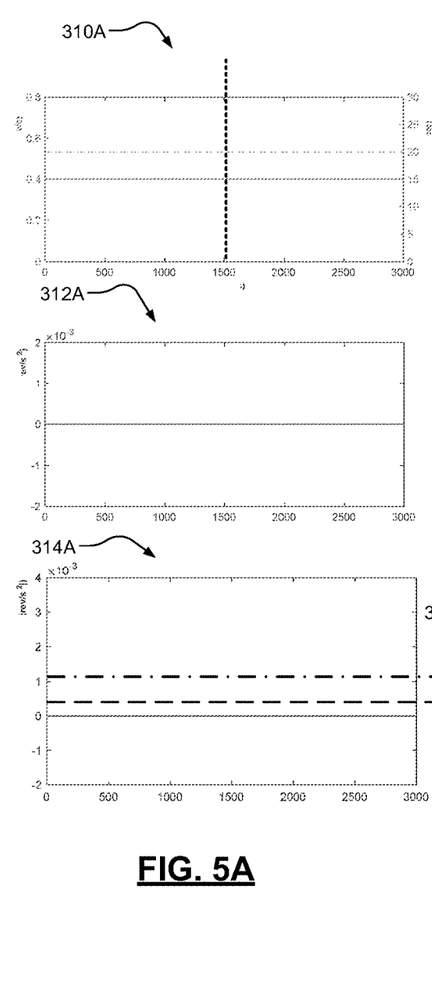
FIG. 5A includes graphs illustrating exemplary angular velocity, angular acceleration, and absolute wheel angular acceleration for a first wheel of a vehicle including the vehicle system of FIG. 1.
Figure 5B:
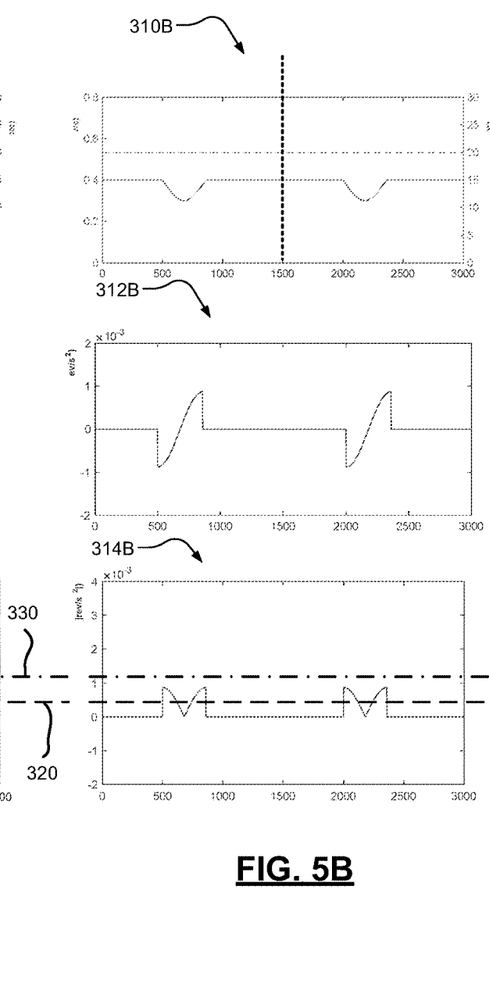
FIG. 5B includes graphs illustrating exemplary angular velocity, angular acceleration, and absolute wheel angular acceleration for a second wheel of the vehicle including the vehicle system of FIG. 1.
Figure 5C:
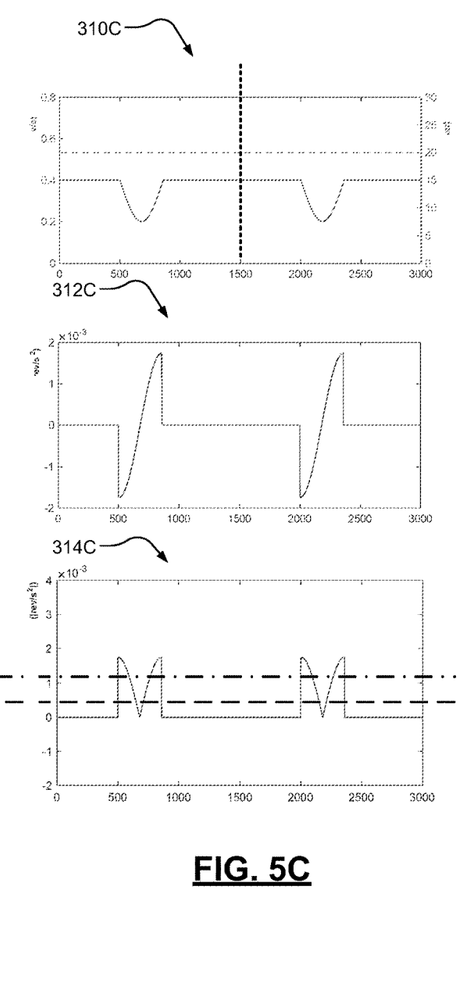
FIG. 5C includes graphs illustrating exemplary angular velocity, angular acceleration, and absolute wheel angular acceleration for a third wheel of the vehicle including the vehicle system of FIG. 1.

From block 252, the method 210 proceeds to block 254, where the diagnostic module 74 records the wheel angular velocity for each of the wheels 12, 14, 16, and 18. The diagnostic module 74 also records the brake pressure based on the brake circuit pressure signal 58. FIGS. 5A, 5B, and 5C illustrate exemplary graphs 310A, 310B, and 310C of wheel angular velocity over time and wheel brake pressure over time for a set number of brake cycles (e.g. two) of four different wheels of the vehicle 110. For example, graph 310A of FIG. 5A shows two wheel cycles of the left front wheel 12, graph 310B of FIG. 5B shows two wheel cycles of the right front wheel 14, and graph 310C of FIG. 5C shows two wheel cycles of the left rear wheel 16. A similar graph may be included for the right rear wheel 18.

From block 254, the method 210 proceeds to block 256. At block 256, the diagnostic module 74 determines the change in the wheel angular velocity, such as the derivative of the wheel angular velocity, the wheel angular acceleration (rev/s$^2$), or jerk (rev/s$^3$), and uses the value as a health indicator of the brake rotors 30. With respect to the wheel angular acceleration, it is calculated as follows: wheel angular acceleration (rev/s$^2$)=(rps (at time=t2)−rps (at time=t1))/(time t2−time t1). FIGS. 5A, 5B, and 5C illustrate exemplary graphs 312A, 312B, and 312C of wheel angular acceleration for wheels 12, 14, and 16 respectively over two wheel cycles. A similar graph may be included for the angular acceleration of the right rear wheel 18.

The diagnostic module 74 then compares the absolute values of the wheel angular acceleration of each wheel to predetermined thresholds to determine whether the brake rotor 30 of each wheel is healthy, in need of attention, or in need of replacement. FIG. 5A illustrates an example of the absolute value of angular acceleration for the wheel 12 at 314A. FIG. 5B illustrates an example of the absolute value of angular acceleration for the wheel 14 at 314B. FIG. 5C illustrates an example of the absolute value of angular acceleration for the wheel 16 at 314C.

At block 258, the diagnostic module 74 determines whether the absolute value of angular acceleration for each one of the different wheels 12, 14, 16, and 18 is less than a predetermined healthy threshold. If the absolute value of a particular wheel is less than the predetermined healthy threshold, then the method 210 proceeds from block 258 to block 260, where the diagnostic module 74 determines that the brake rotor 30 associated with the particular wheel is healthy. At block 262, the user interface device 28 informs the driver that the brake rotor is healthy.

If at block 258 the absolute value of angular acceleration of a particular wheel is greater than the predetermined healthy threshold, the method proceeds from block 258 to block 264. At block 264, the diagnostic module 74 determines whether the absolute value of angular acceleration of a particular wheel is less than a predetermined replacement threshold. If the absolute value is less than the predetermined replacement threshold, the method 210 proceeds to block 266. At block 266, the diagnostic module 74 determines that the brake rotor 30 associated with the particular wheel is in need of attention, and at block 262 the user interface device 28 informs the driver that the brake rotor is in need of attention (i.e., should be inspected). If at block 264 the diagnostic module 74 determines that the absolute value of angular acceleration is not less than the replacement threshold, then the absolute value of angular acceleration must be greater than the replacement threshold and the method 210 proceeds to block 268. At block 268, the diagnostic module 74 determines that the brake rotor of the particular wheel is in need of replacement, and at block 262 the driver is informed that the brake rotor is in need of replacement.

FIGS. 5A, 5B, and 5C illustrate three exemplary brake rotor health scenarios for the rotors 30 associated with wheels 12, 14, and 16. With respect to FIG. 5A, the rotor associated with the left front wheel 12 is determined by the diagnostic module 74 to be "healthy," because there is no change in the wheel angular velocity during the test period, and thus the absolute value of the acceleration of the wheel 12 remains at 0 in graph 314A. Thus, the rotor 30 associated with the wheel 12 most likely has no measurable wear and no degradation in performance.

With respect to FIG. 5B, the rotor associated with the right front wheel 14 is determined by the diagnostic module 74 to require attention, but is not yet in need of replacement. The change in wheel angular velocity and acceleration during the test period is significant enough that the absolute value of the acceleration of the wheel 14 is greater than the healthy threshold 320 in the graph 314B, but less than the replacement threshold 330. Thus, the rotor 30 associated with the wheel 14 has measurable wear and a slight degradation in performance, but is not yet in need of replacement. The degradation in performance may be caused by an area of increased or decreased thickness on the rotor 30. The healthy threshold 320 (i.e., first predetermined threshold) may be any suitable threshold, such as $0.4 \times 10^{-3}$ revolutions/second$^2$.

With respect to FIG. 5C, the rotor associated with the left rear wheel 16 is determined by the diagnostic module 74 to be in need of replacement. The change in wheel angular velocity and acceleration during the test period is significant enough that the absolute value of the acceleration of the wheel 16 is greater than the replacement threshold 330 in the graph 314C. Thus, the rotor 30 associated with the wheel 16 has measurable wear and a degradation in performance significant enough to be in need of replacement. The degradation in performance may be caused by an area of increased or decreased thickness on the rotor 30 that is greater than the increased or decreased thickness of the rotor 30 associated with the right front wheel 14. The replacement threshold 330 (i.e., second predetermined threshold) may be any suitable threshold, such as $1.2 \times 10^{-3}$ revolutions/second$^2$.

The present disclosure thus advantageously allows the health of the brake rotors 30 to be assessed without visually inspecting the rotors 30. The health of the rotors 30 may be performed on-demand, or at regularly scheduled time or mileage intervals. The health determination may be displayed to the driver by way of the user interface device 28. Also, a customer, fleet operator, dealership, manufacturer, etc. may be notified of the health determination by way of any suitable application, internet interface, monthly status email, etc. As a result, the brake rotors 30 may be regularly monitored to make sure that they are operating at acceptable performance levels.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system configured to assess health of a rotor of a friction brake configured to brake a wheel of a vehicle, the system comprising:
   a brake control module configured to actuate the friction brake such that brake pads on opposite sides of the rotor clamp onto the rotor at a target pressure sufficient to maintain the vehicle at a crawl speed; and
   a diagnostic module configured to, while the vehicle is at the crawl speed and the friction brake is at the target pressure:
   record rotational speed of the wheel;
   identify a change in the rotational speed of the wheel;
   determine whether the change in the rotational speed of the wheel exceeds a predetermined threshold;
   when the change in rotational speed of the wheel does not exceed a predetermined threshold, generate a notification indicating that the rotor of the friction brake configured to brake the wheel is healthy; and
   when the change in the rotational speed of the wheel exceeds the predetermined threshold, generate a notification indicating that the rotor requires attention.

2. The system of claim 1, wherein the predetermined threshold is a first predetermined threshold and the notification is a first notification; and
   wherein when the change in the rotational speed of the wheel exceeds a second predetermined threshold that is greater than the first predetermined threshold, the diagnostic module is configured to generate a second notification indicating that the rotor of the friction brake configured to brake the wheel requires replacement.

3. The system of claim 2, wherein the change in the rotational speed of the wheel at the second predetermined threshold is three times the change in the rotational speed of the wheel at the first predetermined threshold.

4. The system of claim 1, wherein the diagnostic module is configured to record the rotational speed of the wheel and identify the change in the rotational speed of the wheel only when the vehicle is traveling in a straight line on a smooth surface.

5. The system of claim 1, wherein the target pressure is 20 psi; and
wherein at the crawl speed, the rotational speed of the wheel is greater than 0 and less than or equal to 1 revolution/second.

6. A system configured to assess health of a rotor of a friction brake configured to brake a wheel of a vehicle, the system comprising:
a brake control module configured to generate a brake control signal indicating a target pressure of brake fluid to be directed to the friction brake for actuating the friction brake to clamp brake pads onto opposite sides of the rotor, the target pressure sufficient to maintain the vehicle at a crawl speed;
a master hydraulic cylinder configured to receive the brake control signal and regulate brake fluid pressure to the friction brake based on the brake control signal to achieve the target pressure of brake fluid at the friction brake and maintain the vehicle at the crawl speed; and
a diagnostic module configured to, while the vehicle is at the crawl speed, the brake fluid of the friction brake is at the target pressure, and the vehicle is traveling in a straight line:
record rotational speed of the wheel;
identify a change in the rotational speed of the wheel;
determine whether the change in the rotational speed of the wheel exceeds a predetermined threshold; and
when the change in the rotational speed of the wheel exceeds a predetermined threshold, generate a notification indicating that the rotor of the friction brake configured to brake the wheel requires attention.

7. The system of claim 6, wherein the target pressure is 20 psi.

8. The system of claim 6, wherein at the crawl speed, the rotational speed of the wheel is greater than 0 revolutions/second and less than or equal to 1 revolution/second.

9. The system of claim 6, wherein at the crawl speed, the rotational speed of the wheel is 0.4 revolutions/second.

10. The system of claim 6, wherein at the crawl speed, speed of the vehicle is greater than 0 kph. and less than or equal to 0.01 kph.

11. The system of claim 6, wherein at the crawl speed, speed of the vehicle is 0.005 kph.

12. The system of claim 6, wherein the predetermined threshold is a first predetermined threshold and the notification is a first notification; and
wherein when the change in the rotational speed of the wheel exceeds a second predetermined threshold that is higher than the first predetermined threshold, the diagnostic module is configured to generate a second notification indicating that the rotor of the friction brake configured to brake the wheel requires replacement.

13. The system of claim 12, wherein the change in the rotational speed of the wheel at the second predetermined threshold is three times the change in the rotational speed of the wheel at the first predetermined threshold.

14. The system of claim 12, wherein the first predetermined threshold is $0.4 \times 10^{-3}$ revolutions/second$^2$, and the second predetermined threshold is $1.2 \times 10^{-3}$ revolutions/second$^2$.

15. A system configured to assess health of a rotor of a friction brake configured to brake a wheel of a vehicle, the system comprising:
a brake control module configured to generate a brake control signal indicating a target pressure of brake fluid to be directed to the friction brake for actuating the friction brake by clamping brake pads onto opposite sides of the rotor, the target pressure sufficient to maintain the vehicle at a crawl speed;
a master hydraulic cylinder configured to receive the brake control signal and regulate brake fluid pressure to the friction brake based on the brake control signal to achieve the target pressure of brake fluid at the friction brake and maintain the vehicle at the crawl speed; and
a diagnostic module configured to, while the vehicle is at the crawl speed, the brake fluid of the friction brake is at the target pressure, and the vehicle is traveling in a straight line:
record angular velocity of the wheel;
determine angular acceleration of the wheel based on the angular velocity of the wheel when the target pressure of the brake fluid is achieved; and
generate a rotor health notification based on an absolute value of the angular acceleration.

16. The system of claim 15, wherein the rotor health notification includes:
a healthy rotor notification indicating that the rotor is healthy when an absolute value of the angular acceleration is at or below a healthy threshold;
an inspect rotor notification indicating that the rotor is in need of inspection when the absolute value of the angular acceleration is above the healthy threshold and below a replacement threshold; and
a replace rotor notification indicating that the rotor is in need of replacement when the absolute value of the angular acceleration is above the replacement threshold.

17. The system of claim 16, wherein the replacement threshold is three times the healthy threshold.

18. The system of claim 15, wherein the target pressure is 20 psi.

19. The system of claim 15, wherein at the crawl speed, rotational speed of the wheel is greater than 0 and less than or equal to 1 revolution/second.

20. The system of claim 15, wherein at the crawl speed, speed of the vehicle is greater than 0 kph. and less than or equal to 0.01 kph.

* * * * *